United States Patent

McAlvay

[15] 3,689,076

[45] Sept. 5, 1972

[54] COMBINED TAPE LIFTING AND CAPSTAN DRIVE ENGAGEMENT MECHANISM

[72] Inventor: John C. McAlvay, Racine, Wis.

[73] Assignee: Webster Electric Company, Inc., Racine, Wis.

[22] Filed: May 20, 1970

[21] Appl. No.: 38,965

[52] U.S. Cl. ....................274/4 D, 226/176

[51] Int. Cl. ....................G11b 15/29

[58] Field of Search ........179/100.2 R; 226/176, 187; 274/4 R, 4 D, 11 E, 11 D

[56] References Cited

UNITED STATES PATENTS

| | | | |
|---|---|---|---|
| 2,793,039 | 5/1957 | Hironimus | 179/100.2 R X |
| 3,372,938 | 3/1968 | Hoag | 274/4 R X |
| 2,623,750 | 12/1952 | Masterson | 274/4 R X |
| 3,137,429 | 6/1964 | Joslow | 226/176 |
| 2,703,714 | 3/1955 | Demby | 179/100.2 R UX |
| 2,524,064 | 10/1950 | Masterson | 274/4 R X |

FOREIGN PATENTS OR APPLICATIONS

| | | | |
|---|---|---|---|
| 1,139,291 | 1962 | Germany | 226/176 |

*Primary Examiner*—Leonard Forman
*Assistant Examiner*—Dennis A. Dearing
*Attorney*—Mason, Kolehmainen, Rathburn & Wyss

[57] ABSTRACT

In a tape recording and/or reproducing mechanism, the tape is wrapped a sufficient distance around a capstan idler wheel so that for high speed operations the tape is lifted fully from the tape heads by movement of the idler wheel away from the capstan drive shaft. The tape heads are positioned between the supply and takeup reels facing the takeup reel. Convenient remote control is possible as a first solenoid is energized to bring the idler wheel against the capstan drive shaft, and a second solenoid is energized to pull the idler wheel away from the capstan drive shaft and tape away from the tape heads. A spring biases the idler wheel lightly towards the capstan drive shaft so that the tape rests against the tape heads when neither solenoid id energized.

7 Claims, 4 Drawing Figures

INVENTOR:
JOHN C. McALVAY
By Mason, Kolehmainen, Rathburn & Wyss
Attorneys

COMBINED TAPE LIFTING AND CAPSTAN DRIVE ENGAGEMENT MECHANISM

The present invention relates to tape recorder drive mechanisms and, more particularly, to mechanisms for controlling the engagement of an idler wheel with a capstan drive shaft and of the tape with one or more tape heads.

Many tape recorders and players include a "capstan" or constant speed drive shaft. This shaft pinches the tape against an idler wheel to pull the tape across one or more recording and/or playback heads at a constant speed. Generally, a relatively massive flywheel is attached to the capstan drive shaft, and the shaft is usually driven by a constant speed motor. Since the inertia of the flywheel makes it impracticable to start and to stop the rotation of the capstan drive shaft whenever it is desired to start and to stop the tape, the idler wheel is pivotally mounted so that it can function as a clutch that can engage and disengage the capstan drive shaft. The idler wheel is pressed against the capstan drive shaft whenever it is desired to have the tape driven forward at a constant speed. When the tape is to be stopped, the idler wheel is pulled away from the capstan drive shaft so that the tape is no longer driven forward. The capstan drive shaft is thus allowed to rotate continuously at a constant speed.

In order to keep the various tape heads of a tape recorder or player clean when tape is moved at high speeds from one tape reel to the other, and in order to prevent wear of the heads, a mechanism is usually provided for lifting the tape from the tape heads. Less expensive machines often use a pivotally mounted array of tape heads which can be swung out of the tape path when the tape moves at high speed. In the better quality machines, the tape heads are rigidly anchored to the tape deck assembly, so tape lifters such as narrow fingers or the like are required to lift the tape away from the recording and playback heads. Repeated contact of the tape with such fingers can result in removal of the oxide surface.

Many machines also use pressure pads or the like intimately to hold the tape in contact with the surface of the tape heads during recording and playback operations. Most good quality machines therefore require a group of complex mechanisms for controlling the engagement of the idler wheel with the capstan drive shaft, for controlling the lifting of the tape from the tape heads, and for holding the tape against the heads.

Accordingly, several objects of the present invention are to provide a remotely controllable tape recorder wherein a single mechanism is used both to control the pressure of the idler wheel against the capstan and to lift the tape from the tape heads; wherein this mechanism not only includes provision for capstan drive and for high speed drive, but also for manual advancement of the tape without capstan drive with the tape in contact with the tape heads; wherein the tape wraps around the idler wheel to a sufficient extent so that motion of the idler wheel can lift the tape completely away from the tape heads; and wherein a single lever and a simple arrangement of solenoids is used to control all the various operations of tape lifting and tape drive.

Briefly stated, the present invention comprises a tape recorder and/or reproducer in which the tape is wrapped around a substantial portion of the idler wheel perimeter. In the operating position the idler wheel is pressed against the capstan and the tape is pulled into intimate contact with the tape heads without the necessity for pressure pads or the like. The motion of the idler wheel away from the capstan drive lifts the tape completely clear of the tape heads for high speed operation without the need for separate tape lifters. A single lever supports the idler wheel, and a spring biases this lever to a position such that the tape is tensioned and held adjacent the tape heads but the idler wheel does not tightly engage the capstan drive shaft. For constant speed record or reproducing operations, a first solenoid coupled to the lever brings the idler wheel into tight engagement with the tape and with the capstan drive shaft. Tape tension holds the tape firmly against the heads without the use of pressure pads or the like. A second solenoid is used to pivot the lever in the opposite direction so as to lift the tape clear of the tape heads. This second solenoid is energized when the tape is moved at high speeds in either direction by rotation of one or both tape reels.

The above and other objects and advantages of the invention appear in connection with the following detailed description of the embodiment of the invention shown in the drawings, wherein.

Figure 1:
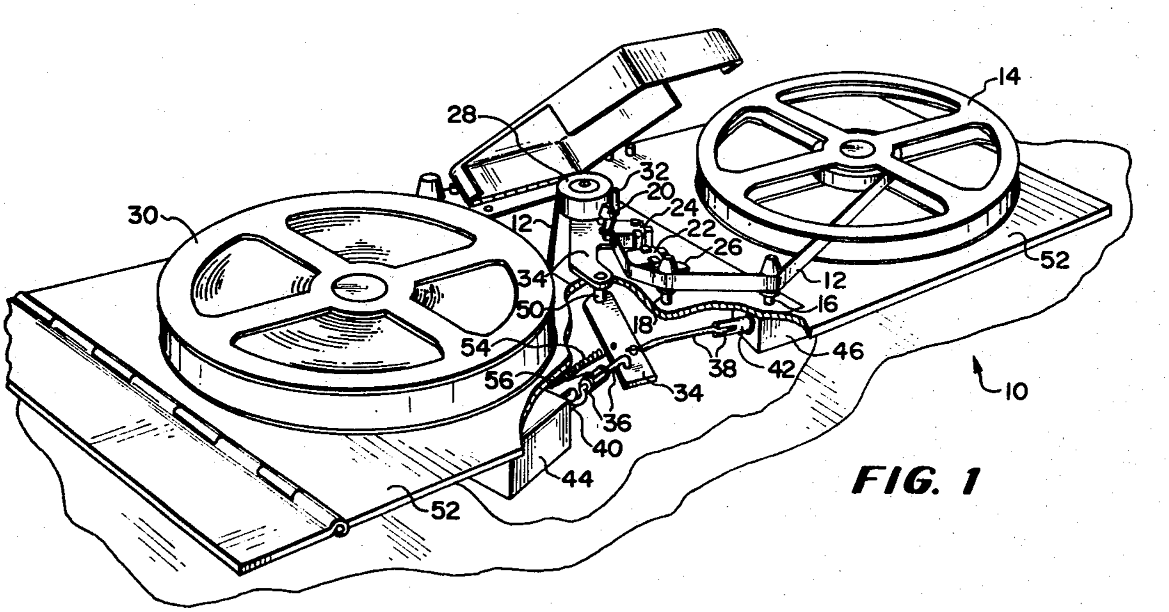
FIG. 1 is a perspective view of a tape deck assembly incorporating a capstan drive engagement and tape lifting mechanism designed in accordance with the present invention, and partly broken away to reveal inner details of the mechanism.

A typical tape deck having a combined capstan engagement and tape lifting mechanism designed in accordance with the present invention is shown in the figures and is indicated generally by the reference numeral 10. Tape 12 from a supply reel 14 is threaded over a series of low friction tape positioning guides or rollers 16, 18 and 20; past recording, playback and erase tape heads 22, 24 and 26; around the perimeter of an idler wheel 28; and to a takeup reel 30. The idler wheel 28 presses the tape 12 against a capstan drive shaft 32 when tape 12 is to be driven at constant speed. The tape heads 22, 24 and 26 are not positioned in front of the reels 14 and 30, as in a conventional tape deck, but are positioned between the reels 14 and 30 facing the takeup reel 30. For high speed operations a separate motor or motors (not shown) drivingly coupled to one or both of the reels 14 and 30 serve to rotate the reels and provide electromagnetic braking in accordance with known practice.

In accordance with one aspect of the present invention, the tape 12 is wrapped around a substantial portion of the idler wheel 28 perimeter. This makes it possible during high speed operation for a simple motion of the idler wheel 28 to pull the tape 12 away from the capstan drive shaft 32, and to simultaneously move the tape 12 away from the tape heads 22, 24 and 26. Hence, a single mechanism which adjusts the position of the idler wheel 28 serves to control the pressure of the idler wheel 28 against the capstan drive 32 thereby to hold the tape against the heads and advance the tape at a constant speed, and to control the lifting of the tape 12 from the heads 22, 24 and 26.

In accordance with another aspect of the invention, the idler wheel 28 and the tape positioning guide 20 are both mounted upon a single lever 34 and are both located at one end of the lever 34. The other end of the lever 34 is connected by suitable connecting levers 36 and 38 to the armatures 40 and 42 of a pair of solenoids 44 and 46. The lever 34 is pivotally attached to the base 52 of the tape deck 10 at a central point 50 on the lever 34. As is shown in the drawings, part of the lever 34 is above the base 52 of the tape deck 10, and the remainder is concealed below the base 52, this being an optional arrangement.

Figures 2, 3, 4:
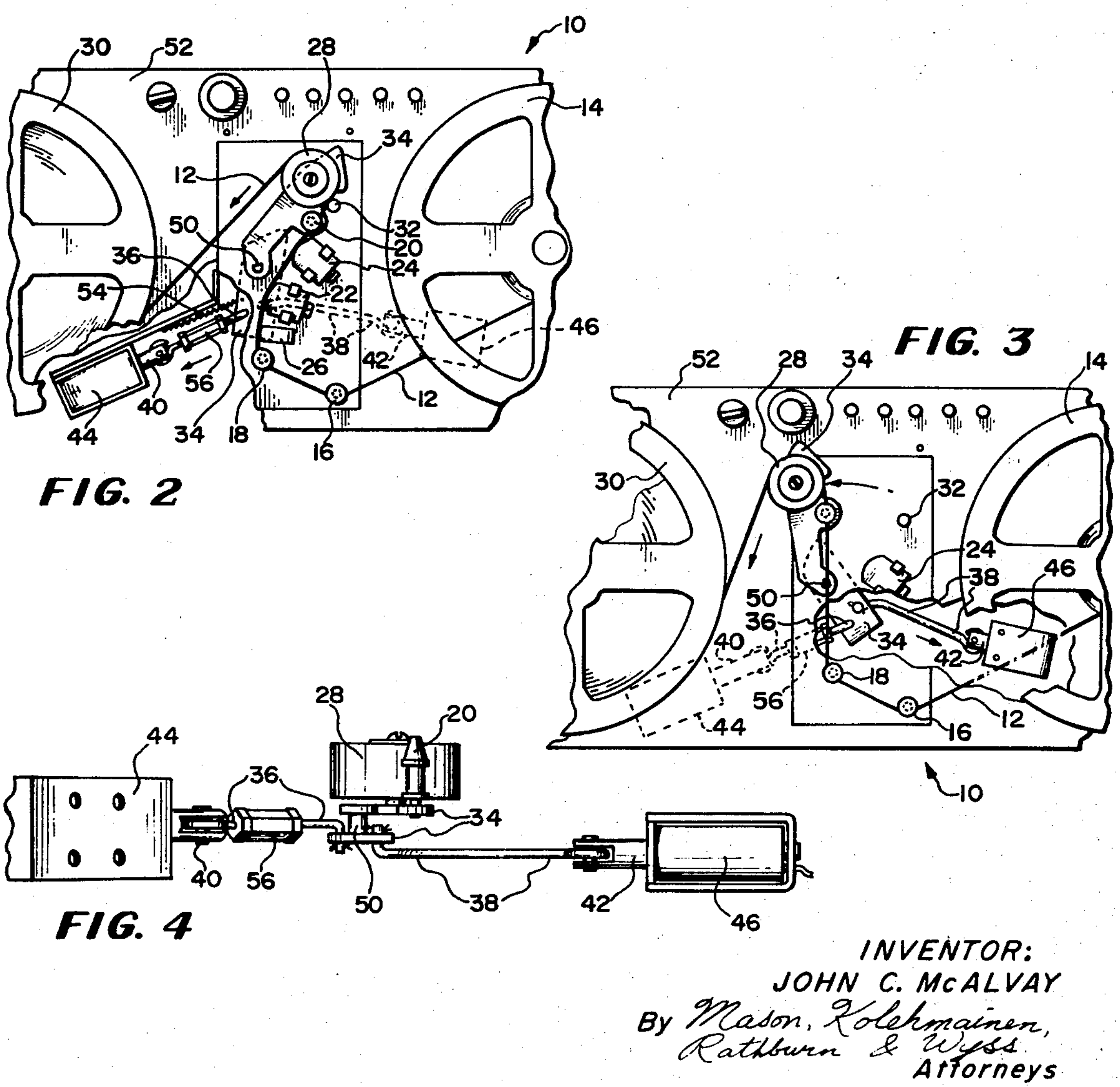
FIG. 2 is a fragmentary plan view of the tape deck shown in FIG. 1 partly broken away to reveal the internal details of the mechanism and illustrating the position of the mechanism when the capstan drive shaft and the idler wheel are in engagement.
FIG. 3 is a fragmentary plan view of the tape deck shown in FIG. 1 partly broken away to reveal the internal details of the mechanism and showing the idler wheel positioned to hold the tape away from both the capstan drive shaft and the tape heads.
FIG. 4 is an elevational view of the moving parts of the mechanism shown in FIG. 1 with all other portions of the tape deck removed for clarity.

When the tape 12 is to be driven forward at a constant speed past the tape heads 22, 24 and 26, the solenoid 44 is actuated. This solenoid 44 shifts the lever 34 so that the idler wheel 28 is brought into tight engagement with the capstan drive shaft 32 and so that simultaneously the tape 12 due to tension applied in conventional manner by the spools 14 and 30 is brought into intimate engagement with the tape heads 22, 24 and 26. The tape 12 is now driven forward at a constant speed by rotation of the capstan 32, and recording to reproducing can take place. The position of the mechanism 10 at this time is best shown in FIG. 2. When the solenoid 44 is deenergized, the pressure between the idler wheel 28 and the capstan drive shaft 32 drops to a level at which the tape is no longer driven forward by the drive shaft 32. A spring 54 (FIGS. 1 and 2) supplies a slight amount of tension to the lever 34 so that tape 12 is maintained in slight tension so that a slack portion does not develop. The reels 14 and 30 can also be manually positioned for cueing, editing and the like. The idler 28 is not pressed against the capstan 32 with sufficient force to deform the idler during periods of non-use.

When the tape 12 is to be advanced in a forward or reverse direction at high speed, for example by drive motors coupled to the supply and takeup spools, the solenoid 46 is actuated. The solenoid 46 swings the idler wheel 28 away from the capstan to the position shown in FIG. 3. This motion of the idler wheel 28 lifts the tape 12 away from the tape heads 22, 24 and 26 so that wear of the tape heads is avoided, so that oxide is not deposited upon the tape heads as the tape advances, and so that distorted sounds are not picked up by the heads. When the solenoid 46 is deenergized, the tape 12 is brought back into contact with the tape heads 22, 24 and 26 by the spring 54.

The tape positioning guides 16, 18 and 20 not only act as pivot points along the path of the tape 12, but also maintain the tape 12 at the properly aligned height required for recording and playback. The guide 20 also keeps the tape loop about the idler wheel 28 from falling when the tape becomes slack due to the absence of tension upon the takeup reel 30.

An adjustment 56 is provided in the lever 36 which connects the armature 40 to the lever 34. This adjustment 56 allows the pressure developed between the capstan drive shaft 32 and the idler wheel 28 to be adjusted. An advantage of the present invention is that no other adjustments are needed. All other positioning components of the mechanism are non-critical. Since two solenoids 44 and 46 control the entire tape transport operation, remote control is facilitated.

While the preferred embodiment of the present invention has been disclosed, it will be understood that numerous other modifications and changes will occur to those skilled in the art. The claims accompanying this specification are intended to encompass all such changes and modifications as come within the true spirit and scope of the present invention.

What is claimed as new and desired to be secured by Letters Patent of the United States is:

1. Tape recording and/or reproducing apparatus comprising in combination:

a frame;

tape supply means mounted upon said frame;

tape takeup means mounted upon said frame and spaced from said tape supply means;

tape guide means, tape head means, and a capstan drive mounted upon said frame and defining a first tape path which extends along a curved line that passes in between the tape supply and takeup means, and that forms an angle greater than 30° with a line joining the supply and takeup means, said tape supply means, tape guide means, tape head means, and the capstan drive lying upon the concave side of said first tape path, said tape takeup means lying upon the convex side of said first tape path, and said capstan drive and said guide means positioned on opposite sides of said head means from one another;

a lever pivotally mounted upon said frame having a free end positioned to swing towards and away from said capstan;

an idler wheel pivotably mounted upon the free end of said lever so as to engage said capstan when the free end of said lever swings towards said capstan;

first idler wheel shifting means for shifting said idler wheel into contact with said capstan drive to define a continuation of said first tape path extending from the capstan drive, about a portion of the idler wheel perimeter, to said tape takeup means;

second idler wheel shifting means for shifting said idler wheel away from said capstan drive to define a second tape path extending from said tape supply means, about said guide means and a portion of the idler wheel perimeter, to said tape takeup means and not engaging said tape head means and said capstan drive.

2. A combination capstan engagement and tape lifting mechanism in accordance with claim 1 wherein the lever carries a tape guide in addition to the idler wheel.

3. A combination capstan engagement and tape lifting mechanism in accordance with claim 1 wherein the lever actuation means includes a solenoid having an armature connecting to the lever, said solenoid swinging the free end of the lever towards the capstan whenever said solenoid is actuated.

4. A combination capstan engagement and tape lifting mechanism in accordance with claim 3 wherein the lever actuation means includes a second solenoid having an armature connecting to the lever, said second solenoid swinging the free end of the lever away from the capstan whenever said second solenoid is actuated.

5. A combination capstan engagement and tape lifting mechanism in accordance with claim 1 wherein the tape recorder frame comprises a flat surface upon which the capstan drive, tape heads, tape guide means, and tape takeup means are mounted; and wherein the lever includes a first arm located above said flat surface including the free end upon which the idler wheel is mounted, a second arm located below said flat surface connecting to said lever actuation means, and a shaft connecting said first and second arms and pivotably passing through said flat surface.

6. Tape recording and/or reproducing apparatus comprising in combination:

a frame;

tape supply means mounted upon said frame;

tape takeup means mounted upon said frame and spaced from said tape supply means;

tape guide means, tape head means, and a capstan drive mounted upon said frame and defining a first tape path which extends along a curved line that passes in between the tape supply and takeup means, and that forms an angle greater than 30° with a line joining the supply and takeup means, said tape supply means, tape guide means, tape head means, and the capstan drive lying upon the concave side of said first tape path, said tape takeup means lying upon the convex side of said first tape path, and said capstan drive and said guide means positioned on opposite sides of said head means from one another;

an idler wheel moveably mounted upon said frame and lying upon the concave side of said first tape path;

first idler wheel shifting means for shifting said idler wheel into contact with said capstan drive to define a continuation of said first tape path extending from the capstan drive, about a portion of the idler wheel perimeter, to said tape takeup means;

second idler wheel shifting means for shifting said idler wheel away from said capstan drive to define a second tape path extending from said tape supply means, about said guide means and a portion of the idler wheel perimeter, to said tape takeup means and not engaging said tape head means and said capstan drive.

7. The apparatus of claim 6 wherein the idler wheel shifting means comprise solenoids attached to said frame and having moveable armatures connecting to said idler wheel.

* * * * *